Patented July 13, 1954

2,683,753

UNITED STATES PATENT OFFICE 2,683,753

HYDRATION OF PROPYLENE WITH BLUE OXIDE OF TUNGSTEN CATALYST

Norman Levy and Robert Kay Greenhalgh, Norton-on-Tees, England, assignors to Imperial Chemical Industries Limited, a corporation of Great Britain No Drawing. Application February 16, 1950, Serial No. 144,576

Claims priority, application Great Britain August 16, 1946

15 Claims. (Cl. 260—641)

This applicaton is a continuation-in-part of co-pending application Serial No. 762,794, filed July 22, 1947, now abandoned.

The present invention relates to the production of isopropanol and has for its object to provide a process of direct catalytic hydration of propylene by which satisfactory conversions of propylene accompanied by high yields of isopropanol can be obtained and by which the appearance of undesired products such as polymers can be kept within satisfactory limits.

In this specification, conversion refers to the percentage of the initial propylene which is changed into other substances in the reaction, and, except where otherwise indicated, yield refers to the molar percentage of isopropanol actually obtained, based on the propylene changed into other substances.

According to the present invention isopropanol is produced by reacting at a temperature in the range of from about 250° C. to about 290° C. and at a pressure of from about 100 atmospheres to about 500 atmospheres water and propylene in the presence of liquid water and of a catalyst containing the oxide of tungsten known as blue oxide and which has a formula approximating to $W_2O_5$.

Within the hereinbefore defined temperature range we have found it particularly desirable to operate at a temperature of about 270° C., and within the hereinbefore defined pressure range we have found it particularly desirable to operate at a pressure in the range between about 150 atmospheres and about 300 atmospheres, for reasons which will appear hereinafter.

While stoichiometric quantities of water and propylene may be used according to the equation $C_3H_6+H_2O \rightarrow (CH_3)_2CHOH$, i. e. a molecular ratio of water to propylene of 1:1, we have found that the tendency to polymer formation is decreased as molecular ratios of water to propylene higher than 1:1 are used, for example 2.5:1. Molecular ratios as high as 20:1 may be used if desired, although we prefer to choose the molecular ratio from the range between about 2:1 and about 15:1, for reasons which will appear hereinafter.

Suitable catalysts may be prepared by a variety of methods. For example, a powdered mixture of tungstic acid (i. e. the compound $WO_3$ or any of its hydrated forms) with about 2% of its weight of graphite may be formed into pellets of a suitable size. Before being used in the reaction step, the pellets thus prepared may be reduced by any convenient means to produce the blue oxide of tungsten. For example they may be reduced by treatment at elevated temperature with hydrogen, carbon monoxide or mixtures containing these gases. A preferred method is to carry out the reduction step by treating the pellets at elevated temperatures with a lower monohydric alcohol, which preferably contains not more than four carbon atoms, such reduction treatment being continued for a suitable period, which may be 3 hours, followed, if desired, by a treatment with water, also at elevated temperature. This method of reduction is conveniently carried out in the reaction vessel, under substantially atmospheric pressure. Alternatively, the pellets may be charged, without previous reduction, into the reaction vessel and treated at elevated temperature with the reactants, whereby the blue oxide of tungsten is formed. As an alternative to tungstic acid in the preparation of the above-mentioned catalyst, ammonium paratungstate may be used, in which case, because ammonia is liberated when the pellets are exposed to elevated temperature, it is desirable to subject the pellets to a reduction treatment at elevated temperature in a separate step.

The process of the present invention is preferably operated as a continuous process in which propylene and water are passed over the tungsten oxide catalyst maintained at a temperature within the range 250° C. to 290° C., and in which, after separating the aqueous reaction products, the unreacted propylene is returned to the process. When operating as a continuous process, the reactant may be passed at any convenient rate over the heated catalyst. It is advantageous, when operating with a molecular ratio of water to propylene of 2.5:1, to use a propylene rate in the range of from 0.8 to 1.0 kg. per hour litre of catalyst space. For higher molecular ratios of water to propylene the propylene rate may advantageously be decreased to a value below 0.8 kg. per hour per litre of catalyst space, say down to and including 0.25 kg. per hour per litre of catalyst space, thereby increasing the conversion.

The products of the reaction may be treated by any convenient means for the recovery of isopropanol. In general this recovery will include cooling the reacted materials to obtain an aqueous product containing isopropanol, which may then be treated for the recovery of isopropanol-water azeotrope, which can, if desired, be further treated for the recovery of substantially dry isopropanol by distillation with an entrainment agent, such as benzene, for the removal of water.

The reaction itself takes place substantially in the vapour phase, but in the presence of liquid water.

Above the upper pressure limit referred to, i. e. 500 atmospheres, and preferably 300 atmospheres, the rise in alcohol formation with increasing pressure is not significant, but the proportion of the propylene converted which is lost as polymer increases sharply.

Below the lower pressure limit of 100 atmospheres, and preferably 150 atmospheres, the output of isopropanol falls to a very low value. This is primarily due to the fact that, while at any given temperature within the range used the partial pressure of water is kept constant at saturation value by the excess water present, the propylene partial pressure is necessarily rapidly diminished by falling total pressure of both reactants. Thus, at two selected temperatures, the following partial pressures are obtained.

|  | Reaction temperature 290° C. | | | Reaction temperature 270° C. | | |
|---|---|---|---|---|---|---|
| Total pressure (atmospheres) | 100 | 150 | 200 | 100 | 150 | 200 |
| Partial Pressure $H_2O$ | 73 | 73 | 73 | 54 | 54 | 54 |
| Partial Pressure $C_3H_6$ | 27 | 77 | 127 | 46 | 96 | 146 |

It will be seen that at a total pressure of 100 atmospheres the propylene partial pressure is extremely low, whereby a low reaction rate and equilibrium quantity of isopropanol in the reaction product are effected.

While the comparatively low output at pressure between about 100 and about 150 atmospheres is acceptable in some cases for technical reasons, at pressures below 100 atmospheres the process is markedly inferior in output, as is shown by the following record of isopropanol outputs at decreasing pressures:

[Output: gms. isopropanol/litre catalyst space/hour.]

| Total pressure (atmospheres) | 270° C. | 290° C. |
|---|---|---|
| 150 | 146 | 160 |
| 100 | 107 | 97 |
| 75 | 70 | Nil |
| 55 | Nil | Nil |

The molar ratio of water to propylene was 15:1 in the above series of experiments taken at 270° C., and 2.33:1 in the series taken at 290° C. The results are, nevertheless, immediately comparable for the reason that we have found that, between the molar ratios of water to propylene of 1:1 and 15:1, the output of isopropanol per unit volume of catalyst space per hour remains substantially constant for a given temperature and pressure and a given total throughput expressed as litres of liquid water plus litres of liquid propylene per litre of catalyst space per hour. For example at 250 atmospheres, 270° C. and 3 litres of liquid ($H_2O+C_3H_6$) per litre of catalyst space per hour, the isopropanol output was found to remain substantially constant at about 200 grams per litre of catalyst space per hour for all molar ratios of water to propylene between 1:1 and 15:1. Above 15:1, the output begins to fall off, being reduced to a half at 20:1, and to a third at 30:1. At the other end of the scale, i. e. at molar ratios of water to propylene less than about 2:1, it was found, as indicated above, that polymer formation increases considerably. For this reason it is preferred, according to an additional feature of this invention, to use a molar ratio of water to propylene within the range between about 2:1 and about 15:1. While it might be thought, from the constant value referred to of the alcohol output over a wide range of water to propylene molar ratios, that the upper end of this range would be definitely preferably (because the conversion of propylene and/or yield of isopropanol obviously must be at a maximum at this upper end), practical considerations will often dictate the use of an intermediate value of the water to propylene molar ratio. Thus, for example, the water, if used in excess, may tend to mask the catalyst and/or may dilute the isopropanol in the product to an undesirable extent.

Within certain limits, the output of alcohol rises with rising reaction temperature, other conditions being equal. Thus, if the above experiment with 3 litres of liquid ($H_2O+C_3H_6$) per litre of catalyst space per hour is repeated at 290° C., the output of isopropanol is found to be about 220 grams per litre of catalyst space per hour. Nevertheless, 270° C. may often be preferred, because the incidence of polymer formation within the range of molar ratios given is less marked at this lower temperature, as is shown by the following record of experiments:

| Reaction temperature, ° C | 270 | 290 |
|---|---|---|
| Molar ratio $H_2O/C_3H_6$ | 2.33:1 | 2.33:1 |
| Gms. isopropanol/litre catalyst space/hour | 200 | 220 |
| Gms. polymer/litre catalyst space/hour | 12 | 27 |
| Yield (weight percentage of isopropanol based on total weight of isopropanol plus propylene polymer produced) | 94.3 | 89 |

Above 290° C., polymer formation was found to be still greater. Further, conversion soon begins to drop as the reaction temperature is raised above this value.

From what has been said, it emerges that polymer formation is encouraged by low molar ratios of water to propylene, high temperatures and, particularly, high pressures. This may be further illustrated by the following experimental results obtained at 290° C. and at a molar ratio of water to propylene of 2.33:1:

| Total pressure (atmospheres) | 100 | 150 | 200 | 250 | 300 | 400 |
|---|---|---|---|---|---|---|
| Gms. isopropanol/litre catalyst space/hr | 97 | 160 | 196 | 220 | 242 | 280 |
| Gms. polymer/litre catalyst space/hr | 4 | 12 | 19 | 27 | 34 | 49 |
| Yield (weight percentage of isopropanol based on total weight of isopropanol plus propylene polymer produced) | 96 | 93 | 91.1 | 89 | 87.6 | 85 |

The following experiments were carried out at 270° C. and with a molar ratio of water to propylene of 15:1, when it was found that polymer formation remained low over the whole pressure range and that the yield of isopropanol remained constant at 99%. The experiments show that even under these conditions the improvement in isopropanol output with rising pressures gradually diminishes as pressures are increased.

| Pressure (atmospheres) | 100 | 150 | 200 | 250 | 300 | 400 | 500 |
|---|---|---|---|---|---|---|---|
| Gms. isopropanol/litre catalyst space/hr | 107 | 146 | 175 | 200 | 214 | 242 | 266 |

Finally, the following are two examples showing in greater detail how the invention may be carried into effect:

*Example 1*

Powdered tungstic acid containing 2% of its weight of graphite was formed into cylindrical pellets 3/16" x 3/16". These pellets were charged into a reaction vessel and treated with isopropanol for 3 hours, the temperature being maintained at 250° C. After treatment with water for 3 hours, the temperature being maintained at 250° C. the temperature was then raised to 271° C. and propylene at a rate of 0.83 kg. per hour per litre of catalyst space and water at a rate of 0.91 kg. per hour per litre of catalyst space were passed over the catalyst, the pressure being maintained at 250 atmospheres. 16.0% of the propylene fed appeared as isopropanol and 1.3% as polymers. The total conversion of propylene was thus 17.3% and the yield of isopropanol was 92.5%.

*Example 2*

0.57 kg. per hour per litre of catalyst space of propylene and 3.4 kg. per hour per litre of catalyst space of water were passed over a catalyst prepared as described in Example 1, the temperature being maintained at 271° C. and the pressure at 250 atmospheres. The conversion was found to be 36.6% and the yield of isopropanol greater than 99.5%. The quantity of propylene appearing as a polymer was less than 0.1% of that fed to the reaction.

We claim:

1. In a process for the production of isopropanol, the step comprising reacting water and propylene at a temperature in the range of from about 250° C. to about 290° C. and at a pressure in the range of from about 100 to about 500 atmospheres in the presence of excess liquid water and of a catalyst consisting substantially of blue oxide of tungsten.

2. In a process for the production of isopropanol, the step comprising reacting water and propylene at a temperature in the range of from about 250° C. to about 290° C. and at a pressure in the range of from about 150 to about 300 atmospheres in the presence of excess liquid water and of a catalyst consisting substantially of blue oxide of tungsten.

3. In a process for the production of isopropanol, the step comprising reacting water and propylene at a temperature of about 270° C. and at a pressure in the range of from about 100 to about 500 atmospheres in the presence of excess liquid water and of a catalyst consisting substantially of blue oxide of tungsten.

4. In a process for the production of isopropanol, the step comprising reacting water and propylene at a temperature of about 270° C. and at a pressure in the range of from about 150 to about 300 atmospheres in the presence of excess liquid water and of a catalyst consisting substantially of blue oxide of tungsten.

5. In a process for the production of isopropanol the step which comprises bringing water and propylene in a molecular ratio of between 1:1 and 20:1 into contact with a catalyst consisting substantially of blue oxide of tungsten at a pressure in the range of from about 100 to about 500 atmospheres, while maintaining the temperature in the range of from about 250° C. to about 290° C.

6. In a process for the production of isopropanol the step which comprises bringing water and propylene in a molecular ratio of between 1:1 and 20:1 into contact with a catalyst consisting substantially of blue oxide of tungsten at a pressure in the range of from about 150 to about 300 atmospheres, while maintaining the temperature in the range of from about 250° C. to about 290° C.

7. In a process for the production of isopropanol the step which comprises bringing water and propylene in a molecular ratio of between about 2:1 and about 15:1 into contact with a catalyst consisting substantially of blue oxide of tungsten at a pressure in the range of from about 100 to about 500 atmospheres, while maintaining the temperature in the range of from about 250° C. to about 290° C.

8. In a process for the production of isopropanol the step which comprises bringing water and propylene in a molecular ratio of between about 2:1 and about 15:1 into contact with a catalyst consisting substantially of blue oxide of tungsten at a pressure in the range of from about 150 to about 300 atmospheres, while maintaining the temperature in the range of from about 250° C. to about 290° C.

9. A process for the production of isopropanol which comprises passing propylene and partly liquid water continuously, at a pressure in the range of from about 100 to about 500 atmospheres, over a catalyst consisting substantially of blue oxide of tungsten, the temperature being maintained in the range of from about 250° C. to about 290° C.

10. A process for the production of isopropanol which comprises passing propylene and partly liquid water continuously, at a pressure in the range of from about 150 to about 300 atmospheres, over a catalyst consisting substantially of blue oxide of tungsten, the temperature being maintained in the range of from about 250° C. to about 290° C.

11. A process for the production of isopropanol which comprises the step of passing water and propylene in a molecular ratio of between about 2:1 and about 15:1 over a catalyst consisting substantially of the blue oxide of tungsten at a pressure in the range of from about 100 to about 500 atmospheres, the temperature being maintained in the range of from about 250° C. to about 290° C., the rate of feeding propylene to the catalyst being in the range of from 0.25 to 1.0 kg. per hour per litre of catalyst space.

12. A process for the production of isopropanol which comprises the step of passing water and propylene in a molecular ratio of between about 2:1 and about 15:1 over a catalyst consisting substantially of the blue oxide of tungsten at a pressure in the range of from about 150 to about 300 atmospheres, the temperature being maintained in the range of from about 250° C. to about 290° C., the rate of feeding propylene to the catalyst being in the range of from 0.25 to 1.0 kg. per hour per litre of catalyst space.

13. A process for the production of isopropanol which comprises the steps of reacting water and propylene in the presence of excess liquid water and of a catalyst consisting substantially of the blue oxide of tungsten contained in a reaction zone at a pressure in the range of from about 100 to about 500 atmospheres, the temperature being maintained in the range of from about 250° C. to about 290° C., removing the reaction products from the reaction zone, cooling the reaction products, separating the cooled aqueous reaction products, and returning unreacted propylene to the reaction step.

14. A process for the production of isopropanol which comprises the steps of reacting water and propylene in the presence of excess liquid water and of a catalyst consisting substantially of blue oxide of tungsten contained in a reaction zone at a pressure in the range of from about 150 to about 300 atmospheres, the temperature being maintained in the range of from about 250° C. to about 290° C., removing the reaction products from the reaction zone, cooling the reaction products, separating the cooled aqueous reaction products, and returning unreacted propylene to the reaction step.

15. A process for the production of isopropanol which comprises the steps of reacting water and propylene at a temperature within the range of from about 250° C. to about 290° C. and at a pressure in the range of from about 100 to about 500 atmospheres in the presence of excess liquid water and of a catalyst consisting substantially of blue oxide of tungsten, the catalyst being prepared by reducing a compound selected from the group consisting of tungstic acid and ammonium paratungstate by treatment at elevated temperatures with a lower monohydric alcohol containing not more than four carbon atoms.

References Cited in the file of this patent

UNITED STATES PATENTS

| Number | Name | Date |
|---|---|---|
| 1,873,536 | Brown et al. | Aug. 23, 1932 |
| 1,907,317 | Brown et al. | May 2, 1933 |
| 2,184,235 | Groll et al. | Dec. 19, 1939 |
| 2,211,302 | Turkevich et al. | Aug. 30, 1940 |
| 2,531,284 | Levy et al. | Nov. 21, 1950 |
| 2,536,768 | Reynolds et al. | Jan. 2, 1951 |

FOREIGN PATENTS

| Number | Country | Date |
|---|---|---|
| 951,860 | France | Apr. 18, 1949 |
| 622,937 | Great Britain | May 10, 1949 |

OTHER REFERENCES

Mellor, "Comprehensive Treatise of Inorganic and Theoretical Chemistry," vol. 11, page 745, published by Longmans, Green & Co., London, 1931.

Fiat, Final Report 968 (P. B. 78,277) Apr. 2, 1947 (Kammermeyer & Carpenter). Abstracted in Journal of Industrial & Engineering Chem., vol. 40, No. 9 (Sept. 1948), page 1620.